United States Patent [19]

Bigham

[11] Patent Number: 5,743,631
[45] Date of Patent: Apr. 28, 1998

[54] LIGHT BAR HEATER

[76] Inventor: James R. Bigham, 209 Murray St., Boise, Id. 83714

[21] Appl. No.: 653,256

[22] Filed: May 24, 1996

Related U.S. Application Data

[63] Continuation-in-part of Ser. No. 438,978, May 11, 1995, abandoned.

[51] Int. Cl.⁶ .............................. F21V 15/00; F21V 29/00
[52] U.S. Cl. .............................. 362/294; 362/74; 362/92
[58] Field of Search ............................ 362/35, 74, 92, 362/223, 294; 392/379, 382, 383; 219/202, 219, 220, 203, 497; 340/521

[56] References Cited

U.S. PATENT DOCUMENTS

| | | |
|---|---|---|
| 685,528 | 10/1901 | Potter. |
| 716,889 | 12/1902 | Hanks. |
| 1,526,523 | 2/1925 | Brown et al.. |
| 3,025,379 | 3/1962 | Ford .................................. 219/34 |
| 4,249,065 | 2/1981 | Malone ................. 219/220 |
| 4,350,287 | 9/1982 | Richards ............... 219/203 |
| 4,533,854 | 8/1985 | Northrup ................. 315/117 |
| 4,557,517 | 12/1985 | Bolduc et al. ............ 296/1 S |
| 4,668,940 | 5/1987 | Beard et al. .............. 340/521 |
| 4,722,030 | 1/1988 | Bowden ..................... 362/69 |
| 4,882,467 | 11/1989 | Dimick ..................... 219/219 |
| 5,027,260 | 6/1991 | Lyons et al. ............... 362/74 |
| 5,091,828 | 2/1992 | Jincks et al. .............. 362/74 |
| 5,206,476 | 4/1993 | Fresch et al. ............. 219/202 |
| 5,221,828 | 6/1993 | Basheer et al. ........... 219/202 |
| 5,264,962 | 11/1993 | Kho ........................... 359/362 |
| 5,420,774 | 5/1995 | Wilson ...................... 362/223 |
| 5,496,989 | 3/1996 | Bradford et al. ......... 219/497 |

*Primary Examiner*—Ira S. Lazarus
*Assistant Examiner*—Matthew Spark
*Attorney, Agent, or Firm*—Frank J. Dykas

[57] ABSTRACT

A heating system for installation and use within an emergency or service vehicle's warning light system. The heating system comprises generally a self-limiting heater which is operatively connected to a fan for displacing air within the light system, creating an exchange of forced air by the heating element. The heating system may further comprise a switch and control relay which is thermostatically actuated or actuated in response to ambient humidity.

1 Claim, 2 Drawing Sheets

LIGHT BAR HEATER

CROSS-REFERENCE TO RELATED APPLICATIONS

This application is a continuation-in-part of my application Ser. No. 08/438,978 filed May 11, 1995, LIGHT BAR HEATER now abandoned.

BACKGROUND OF THE INVENTION

1. Field of the Invention

The present invention relates generally to electric heaters, and more particularly to an electric heater for use in light bars of the type which is typically employed by emergency and service vehicles.

2. Description of Related Art

Emergency and service vehicles are typically outfitted with a system of warning lights which are utilized primarily for warning or otherwise notifying persons in the general vicinity of the presence of an emergency or service situation. Emergency and service situations may include ambulance, fire, police, road and rail maintenance, and any of the other applications in which notifying or warning persons located in the general vicinity is a priority. For improved visibility and easier aftermarket installation, these lighting systems are typically mounted on the roof or other high point of a vehicle. In this position, these systems are exposed to all elements of the weather including rain, snow, sleet, hail, humidity and direct sunlight. These conditions create a multitude of operational situations which diminish the efficiency of the performance of these lighting systems. These conditions include icing and an accumulation of snow on the outside of the lighting system lenses, water penetration of the light bar, condensation of water inside the light bar. Similarly, repeated cycles of heating and cooling in conditions where the air may be saturated with moisture can cause fogging of the inside of the lenses and result in an accumulation of water within the lighting system. These conditions can actually result in failure of the lighting bar or other warning system through shorting, corrosion, or immobilizing of the rotating reflectors of the light bar.

Vehicle warning light bars are typically made in several sections. A center section may hold the siren and loud speaker, while the two outer sections typically contain lights and rotating mirror mechanisms. The lights are typically halogen bulbs, and produce intense light, as well as heat. The heat and light are dissipated by the use of rotating reflectors. The outer sections containing lights, rotating reflectors, and the motors which drive them, are typically covered by a transparent covering composed of Lexan, or other plastic. Lexan has a melting point of approximately 240°–345° F., depending on the type of Lexan used, and discolors at approximately 250° to 275° F. The rotating reflectors of the light section are driven by nylon gears which have a melting point of about 200° F., depending on the type of nylon used. The reflectors are driven by small electric motors. The electric motors which are located in the lighting section of the light bars also have heat related limits, due to the melting point of the insulating glyptal resin which covers the copper wire in the windings of the motor. The motors themselves generate heat, and added environmental heat can exceed the tolerance of the insulating glyptal resin. When these motors are subjected to temperatures above 200°, the life span of the motor is seriously shortened.

A further structural feature of emergency vehicle light bars is that the Lexan or plastic coverings mount on to the light bar by sitting on top of or pressed against hard rubber gaskets. Hard rubber is used rather than soft rubber for increased resistance to UV radiation, to water, and to heating and cooling. This allows the Lexan or plastic covering to be removable for maintenance of the lights, motors and moving parts of the interior system. Lexan and other plastics expand and contract as they are heated or cooled. An uneven expansion of the Lexan or other plastic light coverings can result in a warping of the covering. This results in an inadequate seal at the gaskets, and can result in moisture entering the light bar.

The low melting point of Lexan and other plastics and the sensitivity of the nylon gears and the small electrical motors to heat, results in difficulty in heating the interior of the lighting unit. Typical resistance heaters, such as the filaments embedded in the rear window glass of automobiles, generate enough heat to melt the Lexan or plastic light bar covering. Since Lexan and other plastics are fairly good insulators, the heat generated by such resistant heaters would not be dissipated throughout the mass of the lens, but would instead result in melting and bubbling of the Lexan or plastic covers. Other resistance heaters also produce enough localized heat to present a risk of melting the Lexan of plastic covers if through mechanical failure the heat is not uniformly distributed throughout the lighting system. The halogen light bulbs of light bars can also melt the Lexan or plastic lens cover if the rotating reflectors fail.

Another feature of emergency vehicle lighting bar systems is that they all have some provision for venting. The venting holes may be very small, or they may be substantial slots, but all lighting systems have some form of venting. Although this is necessary to allow moisture within the lighting system to dissipate to the outside, the vent can also allow moisture from the outside to permeate the inside.

As a result of the factors discussed above, a variety of conditions can exist in the service environment for these types of lighting systems which can create problems. Visibility can be decreased as the lenses are covered by ice and snow. Accumulation of moisture within the lighting system can reduce visibility, cause corrosion, short out electrical components, or freeze in the gears of the reflector motors. If the reflector rotating mechanism fails, the heat from the light bulb will melt the nearby Lexan or plastic lens. Increased temperature within the lighting system can shorten the life span of motors and electrical components.

Therefore, an object of the present invention is to provide a means for eliminating the accumulation and build-up of ice and snow on the outside surface of the lenses for emergency and service vehicle lighting systems.

Another object of the present invention is to provide a means to eliminate fogging and condensation on the inside surfaces of the lenses of emergency and service vehicle lighting systems. Yet another object of the invention is to automatically prevent the accumulation and build up of snow and ice on the outside surface of the lenses for emergency and service vehicle lighting systems. Still another object of the invention is to automatically eliminate fogging and condensation on the inside surfaces of the lenses of emergency and service vehicle lighting systems.

A further object of the invention is to provide a heating system which operates at a temperature which is safe for all of the components of the vehicle lighting system. A further object of the invention is to provide a lighting system which is activated by the air temperature or the air humidity. A further object of the invention is to provide a heating system which causes the gradual and uniform heating of the entire surface of the lighting system cover, without localized hot spots. Another object is to provide a means to dehumidify the air inside the light bar.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combination particularly pointed out in the appended claims.

SUMMARY OF THE INVENTION

According to the present invention, the foregoing other objects and advantages are obtained by providing a heating and water removing system for vehicle warning light bars. The system is installed within the light bars and consists of one or more heater and fan units located within the vehicle warning light and a source of power electrically connected to the heater and fan units. Typically, the heater and fan units comprise a heater block, electric fan, and a control relay. The system may optionally contain a manually operated switch. The heating blocks of the system described above may consist of one or more resistive heater elements. Such heater elements can be of a ceramic type with embedded conductive metal particles. If such ceramic/metal heating elements are used, a type with a self limiting heat output may be utilized. This type of heating unit has a characteristic of increased resistance as its temperature increases. At higher temperatures its amperage drops drastically, thus limiting its ultimate heat output. The system described above can be operated by thermostatically controlled sensor and/or a humidistatically controlled sensor.

The system would also include a relay which is actuated by a vehicle ignition switch and prevents the system from operating unless the vehicle ignition switch is on. The system would typically use the vehicle battery as the source of energy. A protective fuse would generally be placed between the heater and fan units and the source of power. The heater and fan units would typically be used in symmetrical right and left arrangements, to coincide with the typical right and left units of light bar systems. If used with a manual switch, the thermostat control in the system would typically be set to activate at 145° F. and to deactivate at 167° F. This is a safe upper limit for all of the heat sensitive components of the light bar system. Similarly, if a humidity activated control relay is utilized in conjunction or as an alternative to the thermostatically controlled relay, it would be activated at approximately 90% relative humidity and deactivated when the humidity inside the light bar reached 45° relative humidity.

According to another aspect of the invention, the heating and water removal system for vehicle warning light bars consists of a pair of symmetrical, right and left heater and fan units located within the light bar system. Each heater and fan unit includes a resistive block heater composed of a ceramic with embedded conductive metal particles and an electric fan. The system is powered by a vehicle battery which is electrically connected to the heater and fan units. Power to the heater and fan units is controlled by a relay between the heater and fan units which is actuated by vehicle ignition switch, a protective fuse, a thermostatic control relay, and/or a humidistatic controlled relay. The system described above may also include a manually operated switch.

The apparatus of the invention, using a heater block, a fan and control mechanisms thus defrosts, defogs, and dewaters an enclosed light bar system. The system keeps all surfaces of the light bar system free of frost, and does so in a way which prolongs the life of the system components. The melting temperatures of the Lexan or other plastic lens cover are not approached by use of the system. Fogging is prevented and humidity is eliminated from the interior of the light bar system by the use of this invention. The safety of the light bar system is further guaranteed by the self-limiting nature of the heat output of the ceramic resistance heating elements. By providing gradual, gentle and uniform heating of the air inside the light bar system, uniform heating is insured, thus preventing uneven expansion and contraction of the light bar cover, with subsequent possibility of leakage at gaskets.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of modifications in various obvious respects, all without departing from the invention. Accordingly, the drawing and description are to be regarded as illustrative in nature, and not as restrictive.

DESCRIPTION OF THE PREFERRED EMBODIMENTS

Figure 1:
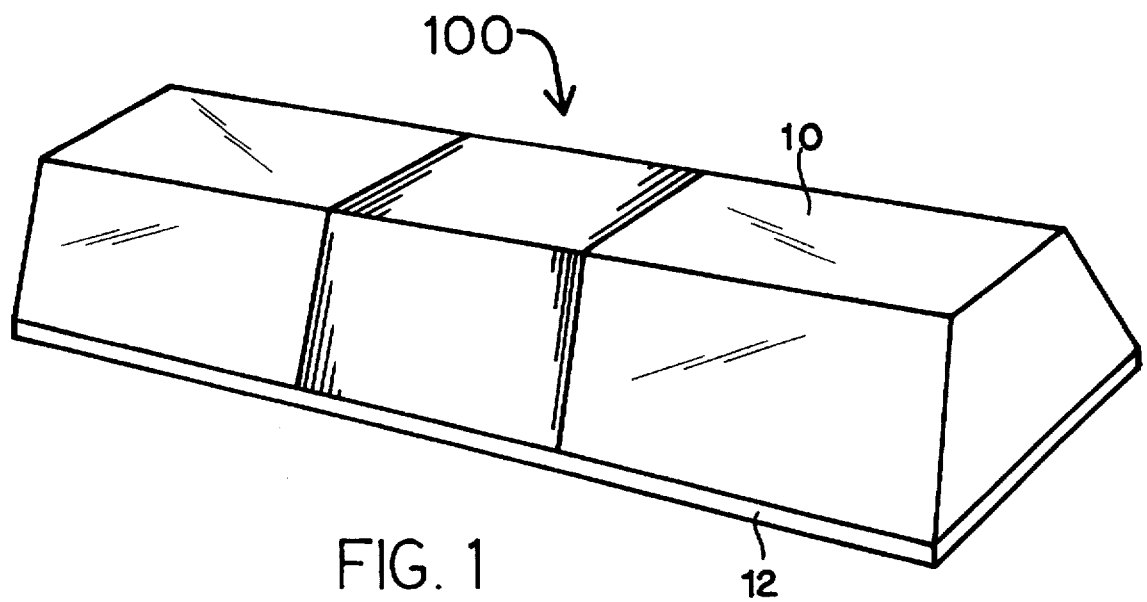
FIG. 1 is a perspective representational view of the exterior of an emergency vehicle warning lighting system.
Figure 2:
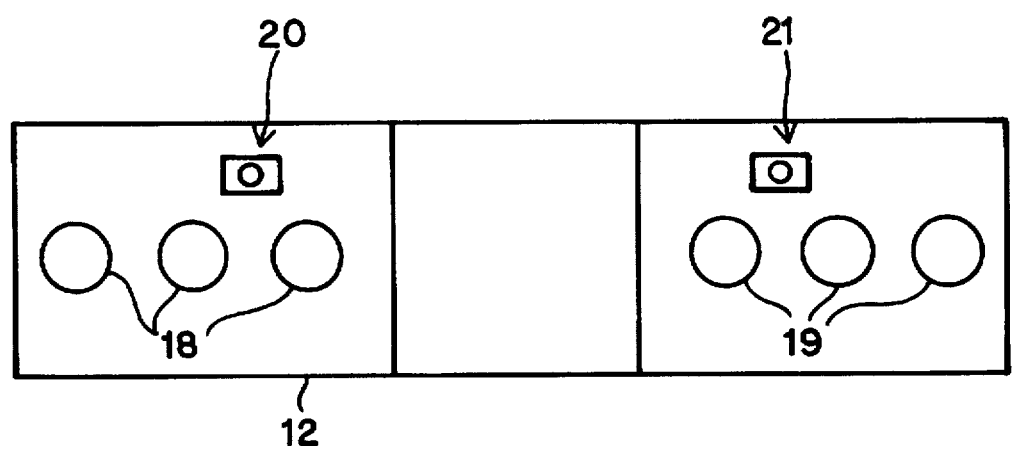
FIG. 2 is a top plan view of an emergency vehicle warning lighting system with the cover removed.

Referring first to FIGS. 1 and 2, emergency vehicle warning light bar 100 consists of a transparent housing section 10, and a base section 12. The lights 18 and 19, are mounted on base section 12 and enclosed by the light bar housing 10. Emergency vehicle warning light bars typically consist of right and left sections so that, for example, left lights 18 are contained within the left section, and right lights 19 are contained within the right section. Left and right heating assemblies 20, 21 of the invention are designed to be disposed within the left and right sections, respectively, of the light bar.

Figure 3:
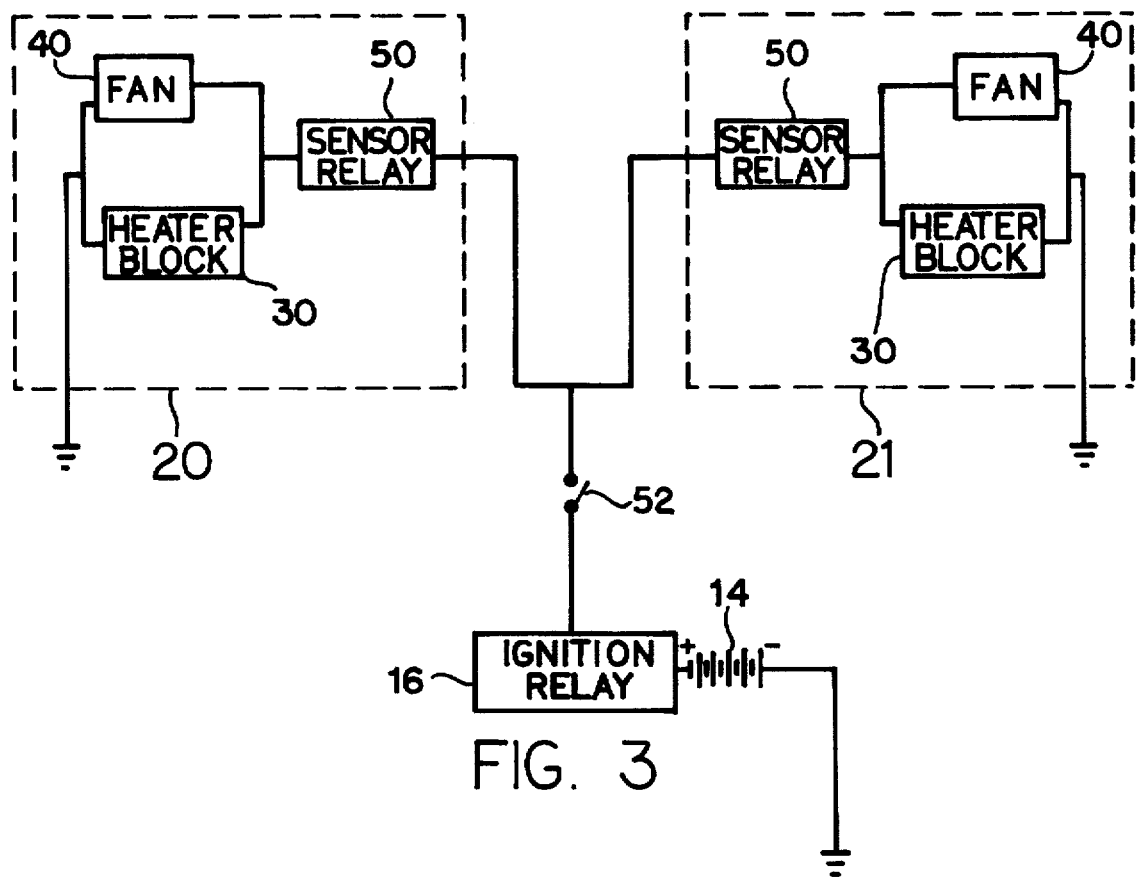
FIG. 3 is a schematic block diagram of the electric light bar heating system of the present invention.

Referring now to FIG. 3 wherein is depicted a schematic block diagram of the invention, electrical power flows from vehicle battery 14 through ignition relay 16 and in parallel to left and right heater and fan units 20, 21, respectively. Vehicle battery 14 is, in the preferred embodiment, a standard 12-volt automotive battery, but in other embodiments could be a variety of other types of batteries. Ignition relay 16 is configured to shut when the vehicle's ignition key is engaged and turned, thus preventing drain of the vehicle battery 14 when the vehicle's engine is not running. When ignition relay 16 is shut, power may flow to heater and fan units 20, 21, if optional switch 52.

Left and right heater and fan units 20, 21 are identical except that each is mounted on a separate portion of light bar base 12 to provide an independent source of heat to the right and left, respectively, areas of the light bar 12. Because left and right heater and fan units 20, 21 are identical, only left heater fan unit 20 will be described. Left heater and fan unit 20 is in general comprised of three components: heater block 30, fan 40, air plenum 54, sensor relay 50, and switch 52. Ignition relay 16, Switch 52 and sensor relay 50 control the power which flows from ignition relay 16 in parallel to heater bar 30 and fan 40. Sensor relay 50 is designed to turn heater block 30 and fan 40 on and off in response to ambient conditions within light bar housing 10.

In the preferred embodiment, sensor relay 50 is thermostatically and/or humidistatically actuated, having a preselected "on" temperature and/or humidity set point and a preselected "off" temperature and/or humidity set point to keep light bar housing 10 free of ice formation and condensation, while at the same time prevent overheating of the components and surrounding equipment at higher ambient temperatures. In the preferred embodiment, the problem of providing gentle and self-limiting heat is solved by utilizing heater block 30 which is a bank of resistive heating elements composed of ceramic with embedded conductive metal particles. Fan 40 is a common electric fan, and in the preferred embodiment, a 12-volt, vaned air fan of the type used to cool electronic components in computers is utilized. This fan has an operating temperature up to 250° F. Fan 40 acts to circulate the heated air generated in the passageways 56 of heater block 30 and provides forced convection heating to surrounding areas of light bar housing 10. Air is drawn through the fan blades into plenum 54, and is pushed through passageways 56 of blocks 30.

Figure 4:
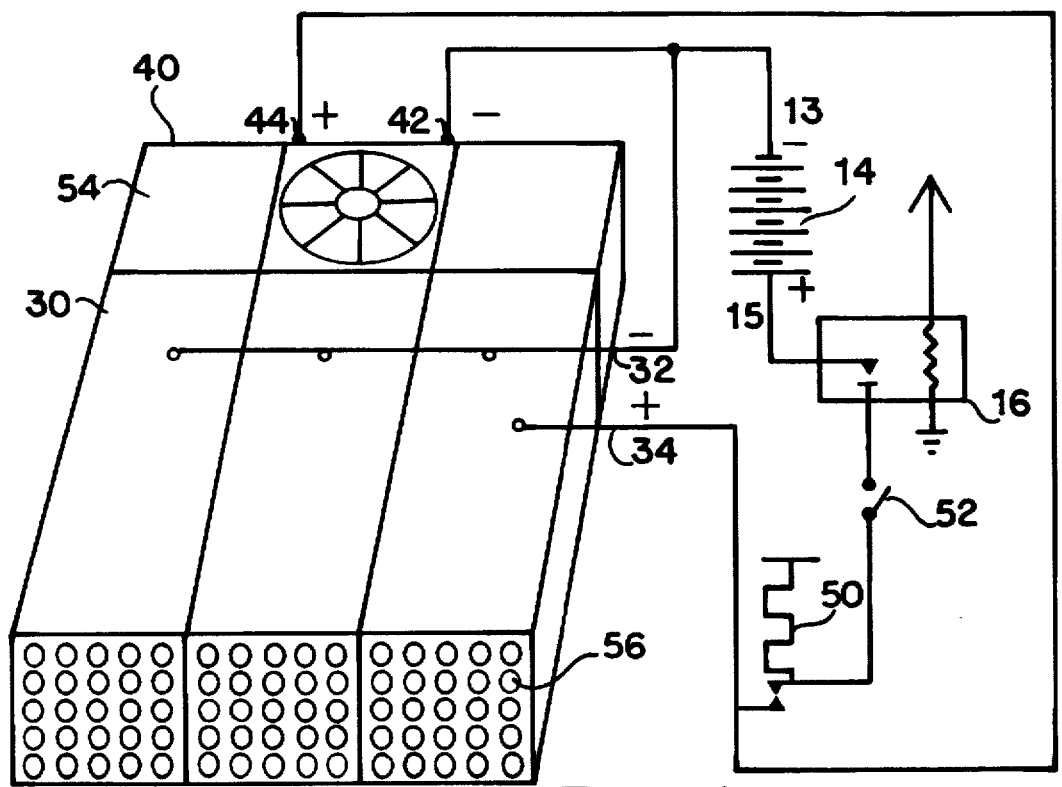
FIG. 4 is an electrical circuit diagram showing the power and control circuitry to one of two symmetrical heating assemblies of the invention.

Reference is now had to FIG. 4 wherein is depicted a circuit diagram of the power and control circuitry for left heater and fan unit 20. It should be noted that the power and control circuitry to right heater and fan unit 21 is identical. Negative pole 13 of battery 14 is connected to the negative poles 32 of heater block 30 and the negative pole 42 of fan 40. Positive pole 15 of battery 14 is connected to ignition relay 16. When ignition relay 16 is shut due to actuation of the vehicle ignition, positive pole 15 of battery 14 is connected through to optional switch 52, and thereby to sensor relay 50. When optional switch 52 is closed and/or when ambient conditions cause sensor relay 50 to shut, positive pole 15 of battery 14 is connected on through in parallel to both positive poles 34 of heater block 30 and positive pole 44 of fan 40, thus completing the electrical circuit for powering heater block 30 and fan 40.

To operate the light bar heater of the invention, the vehicle ignition key is engaged in the ignition key slot and turned, shutting ignition relay 16. The circuit path from vehicle battery 14 through ignition relay 16 and in parallel to heater block 30 and fan 40 is then established if, and only if optional switch 52 is closed and/or if sensor relay 50 is shut. Sensor relay 50 will operate in response to the ambient temperature and/or humidity within the respective section of light bar housing 10 in which the relay is located. When ambient temperature within light bar housing 10 drops below the preseleted "on" set point, or when ambient humidity rises above the preselected "on" set point, sensor relay 50 will shut, energizing heater block 30 and fan 40. Heater block 30 will heat the air surrounding the heater block and fan 40 will circulate this air throughout the respective section light bar housing 10, raising the ambient temperature. The heater is located toward one end of the light bar, and air is directed out from the heater block along the long axis of the light bar to the other end. In this way, the heat is applied uniformly and gradually to the entire light bar cover. Once the ambient temperature reaches the upper preselected temperature "off" set point, and the ambient humidity reaches the lower preselected humidity "off" set point, sensor relay 50 will open, de-energizing heater block 30 and fan 40. If the light bar is in winter conditions, the ambient temperature within light bar housing 10 will then begin to drop due to radiative and conductive heat losses until the temperature again drops to the low set point, causing sensor relay 50 again to shut.

In the best mode, manually operated switch 52 is turned on the operator of the vehicle when conditions require defrosting or defogging of the light bar. In this mode of operation, the light bar heater would be activated when switch 52 is closed and when the temperature inside the light bar is less than 145° F. When the temperature reaches 167° F., the thermostatic control would deactivate the heater until the temperature decreased to 145° F. again. If the heating unit were being operated for the purpose of water or humidity removal, when the operator closed switch 52 the heater unit would come on if the relative humidity were greater than 90%, and would stay on until the relative humidity became less than 50%.

In another mode of the invention, manually operated switch 52 could be eliminated and the set points of the thermostat and humidistat would operate automatically to defrost, defog, and dewater the interior of the light bar.

The cycle may thus continue indefinitely, until the vehicle ignition key is removed and ignition relay 16 opens, or until switch 52 is opened. If the heater and light bar are operating in warm but humid conditions, the heater block 30 and fan 40 will continue in the "on" position until the humidity inside the light bar system drops below the preselected "off" set point. This type of operation removes moisture from the light bar system by first suspending it in the warm air. Warm air has the ability to carry a higher percentage of moisture than cool air, therefore the condensed moisture will turn into a gas and be circulated by the fan. Since all vehicle lighting systems have a vent system, the high moisture air of the interior of the lighting system will gradually dissipate out through the vent system of the light bar, and be replaced by cooler air, which carries a lower percentage of moisture. This action not only removes condensation from the interior of the light bar, thus improving visibility, it also eliminates electrical shorts and corrosion of interior components.

The best mode of the current invention utilizes the resistive ceramic heating block which is impregnated with conductive metal particles. The particular heating block of the best mode is described in Republic of China Patent No. 41331. It has the property of increased resistance to electricity as the heating block becomes hotter. For instance, when the heating block is at 100° F., it uses about 8 amps of electricity. When the heating block is between 100° F. and 200° F., the heating block uses about 5 amps of electricity. At greater than 225° F. the amperage of the heating block drastically drops off. This characteristic provides an additional safety factor against overheating of the interior of the light bar or of the nearby Lexan or plastic. With this inherent feature of the heating block, even if the electric fan and the control relays failed, the heat output from the heating block would be self controlling and would not result in the destruction by melting of the nearby Lexan or plastic lens cover. Use of this type of heating element is a unique and valuable application. The problem this addresses is gentle and self-limiting heating of the interior of the light bar.

Thus, the present invention provides a means of automatically preventing the accumulation or build-up of snow and ice on the inside surface of the lenses for emergency and service vehicle lighting systems, while at the same time automatically eliminating fogging and condensation on the inside surfaces of the lenses. Both of these functions are provided by a system which circulates heated air down the length of the light bar section. This circulation of heated air down the long axis of the light bar section serves to heat the light bar cover uniformly and gradually. By heating the light bar cover uniformly, the light bar cover is not subject to uneven expansion and contraction, and therefore it's contact with the hard rubber gasket seals remains intact. By heating the light bar cover gradually, no hot spots are allowed to develop in the light bar cover material and cause problems due to the low melting point of Lexan or other plastics. Likewise, no problems with yellowing or cracking of these materials will occur as a result of excessive heat. Elevated temperatures within the light bar are kept to a minimum, thus prolonging the life span of components.

The invention provides a safe way of uniform heating of all components of the light bar system, and even if the fan or control relays fail, the heating units of the invention are inherently limited as to how much heat they will produce. The maximum heat output is within safe parameters for Lexan or other plastic materials of the light covers.

While there is shown and described the present preferred embodiment of the invention, it is to be distinctly understood that this invention is not limited thereto but may be variously embodied to practice within the scope of the following claims.

I claim:

1. A heating and water removal system for vehicle warning light bars, comprising:

a pair of symmetrical first and second heater and fan units located within the vehicle warning light bar, with each heater and fan unit comprising a self-limiting heater comprised of one or more resistive heater elements, an electric fan for circulating heated air, and a control relay thermostatically actuated and/or actuated by relative humidity of 90% inside said vehicle warning light bar, and deactuated by relative humidity of 50% inside said vehicle light bar, operably connected to said heater and fan;

a vehicle battery as a source of power electrically connected to the heater and fan units, including a relay and a protective fuse interdisposed between the heater and fan units and the source of power, wherein the relay is actuated by the vehicle ignition switch; and a manually operated switch for activating said heater and fan units.

* * * * *